(12) United States Patent
Gitschlag

(10) Patent No.: US 9,186,623 B2
(45) Date of Patent: Nov. 17, 2015

(54) RECYCLED PURGE AIR DRYER SYSTEM AND METHOD OF USE

(71) Applicant: Roger's Machinery Company, Inc., Tigard, OR (US)

(72) Inventor: Robert Gitschlag, Oregon City, OR (US)

( * ) Notice: Subject to any disclaimer, the term of this patent is extended or adjusted under 35 U.S.C. 154(b) by 0 days.

(21) Appl. No.: 14/200,249

(22) Filed: Mar. 7, 2014

(65) Prior Publication Data

US 2014/0260967 A1    Sep. 18, 2014

Related U.S. Application Data

(60) Provisional application No. 61/779,380, filed on Mar. 13, 2013.

(51) Int. Cl.
*B01D 53/02* (2006.01)
*B01D 53/26* (2006.01)
*B01D 53/04* (2006.01)

(52) U.S. Cl.
CPC .......... *B01D 53/261* (2013.01); *B01D 53/0462* (2013.01); *B01D 53/265* (2013.01); *B01D 2258/06* (2013.01); *B01D 2259/402* (2013.01); *B01D 2259/4009* (2013.01); *B01D 2259/40052* (2013.01); *B01D 2259/40062* (2013.01); *B01D 2259/40079* (2013.01)

(58) Field of Classification Search
CPC .............................. B01D 53/261; B01D 53/265
See application file for complete search history.

(56) References Cited

U.S. PATENT DOCUMENTS

| | | | | |
|---|---|---|---|---|
| 6,092,375 A | * | 7/2000 | Denniston | 62/94 |
| 6,171,377 B1 | * | 1/2001 | Henderson | 96/122 |
| 2005/0283282 A1 | * | 12/2005 | Pervaiz | 701/19 |
| 2010/0229719 A1 | * | 9/2010 | Huberland et al. | 95/15 |

* cited by examiner

*Primary Examiner* — Christopher P Jones
(74) *Attorney, Agent, or Firm* — Nicole Hyatt

(57) ABSTRACT

Heat generated by the first stage compressor while it is running (either loaded or unloaded in the recycled purge air dryer system is recaptured by a stream of dried, cool system air drawn off of the outlet of a online drying tower in an air compressor system via a purge heat exchanger placed after the first stage compressor. The dried, hot air is used help regenerate the offline tower. This regenerating, pressurized, and heated purge air is then cooled in its passage across or through the desiccant in the regenerating tower. It then reenters the main airflow at the outlet of the first stage air compressor as wet cool pressurized purge air. This process is completely closed loop within the system, achieving zero air loss, and avoiding dew point spikes, increasing the efficiency of the air compressor system.

3 Claims, 11 Drawing Sheets

VALVE POSTIONS FOR FIG. 2

| Valve   | Position |
|---------|----------|
| 3 (AL)  | Open     |
| 5 (AR)  | Closed   |
| 7 (BL)  | Closed   |
| 9 (BR)  | Open     |
| 11 (CL) | Closed   |
| 13 (CR) | Open     |
| 15 (DL) | Open     |
| 17 (DR) | Closed   |
| 19 (PH) | Open     |
| 21 (PC) | Closed   |

FIG. 3

TRANSITIONS AND VALVE POSITIONS FOR FIG. 4

| Transitions | |
|---|---|
| Valve | Position |
| 19 (PH) | Closes |
| 21 (PC) | Opens |
| Valve Positions | |
| Valve | Position |
| 3 (AL) | Open |
| 5 (AR) | Closed |
| 7 (BL) | Closed |
| 9 (BR) | Open |
| 11 (CL) | Closed |
| 13 (CR) | Open |
| 15 (DL) | Open |
| 17 (DR) | Closed |
| 19 (PH) | Closed |
| 21 (PC) | Open |

FIG. 5

TRANSITIONS AND VALVE POSITIONS FOR FIG. 6

| Transitions    |          |
|----------------|----------|
| Valve      | Position |
| 7 (BL)         | Opens    |
| 9 (BR)         | Closes   |
| Valve Positions | |
| Valve      | Position |
| 3 (AL)         | Open     |
| 5 (AR)         | Closed   |
| 7 (BL)         | Open     |
| 9 (BR)         | Closed   |
| 11 (CL)        | Closed   |
| 13 (CR)        | Open     |
| 15 (DL)        | Open     |
| 17 (DR)        | Closed   |
| 19 (PH)        | Closed   |
| 21 (PC)        | Open     |

FIG. 7

TRANSITIONS AND VALVE POSITIONS FOR FIG. 8

| Transitions | |
|---|---|
| Valve | Position |
| 3 (AL) | Closes |
| 5 (AR) | Opens |
| 15 (DL) | Closes |
| 17 (DR) | Opens |
| 19 (PH) | Opens |
| 21 (PC) | Closes |
| Valve Positions | |
| Valve | Position |
| 3 (AL) | Closed |
| 5 (AR) | Open |
| 7 (BL) | Open |
| 9 (BR) | Closed |
| 11 (CL) | Closed |
| 13 (CR) | Open |
| 15 (DL) | Closed |
| 17 (DR) | Open |
| 19 (PH) | Open |
| 21 (PC) | Closed |

FIG. 9

TRANSITIONS AND VALVE POSITIONS FOR FIG. 10

| Transitions | |
|---|---|
| Valve | Position |
| 11 (CL) | Opens |
| 13 (CR) | Closes |
| Valve Positions | |
| Valve | Position |
| 3 (AL) | Closed |
| 5 (AR) | Open |
| 7 (BL) | Open |
| 9 (BR) | Closed |
| 11 (CL) | Open |
| 13 (CR) | Closed |
| 15 (DL) | Closed |
| 17 (DR) | Open |
| 19 (PH) | Open |
| 21 (PC) | Closed |

FIG. 11

US 9,186,623 B2
RECYCLED PURGE AIR DRYER SYSTEM AND METHOD OF USE

CROSS REFERENCE TO RELATED APPLICATION

This application claims the benefit under Title 35, United States Cod, Section 120 of U.S. patent application Ser. No. 61/779,380 filed Mar. 13, 2013 which is hereby incorporated by reference into this application.

Many industries require extremely dry air for pneumatic systems to function properly. A well-known way to deliver extremely dry air is to employ a dual tower absorption drying system, where a first desiccant filled tower is "online," while the second desiccant filled "offline" tower is regenerating. The online tower continuously receives moisture-laden air to dry, until its desiccant is depleted. Then, the inlet air is switched to the offline (now online) tower, while the desiccant in the first tower is regenerated by various methods such as heating, evacuation, or passing purge air through it. Hence, the first and second towers alternate between absorption and regenerating phases over a predetermined time interval.

Diverting a portion of dried air coming off the online tower can be used to regenerate the offline desiccant, if it is passed through the offline tower at a lower pressure. Unfortunately, in prior art, 8-15% of the dry air exiting the "online" tower was diverted to the offline tower for regeneration; thus, lowering the efficiency of the air compressor. The 8-15% dry air being used for purge is vented to atmosphere, which requires over-sizing the compressor to deliver desired volume of air, at pressure, for the customer to compensate for the loss.

Some dryer designs use external electric heaters, or heat from the compressor to reduce purge flow. However, these still dump purge air into the atmosphere, wasting compressed air.

"Heat of Compression" dryers use hot air from the compressor, before the aftercooler to regenerate the desiccant in one tower, and then the air is cooled, and then dried in the second tower. As the wet hot air is used to regenerate the offline tower, the two towers experience an increasing pressure drop. The offline tower does not regenerate when unloaded, and low air usage does not allow the compressor to run at a high enough temperature to regenerate the offline tower.

The drum dryer is a form of heat of compressor dryer that uses a specially constructed desiccant drum. The drum rotates while in operation. A percentage of the hot air, before the aftercooler, is drawn off to regenerate part of the drum. There is a wedge shaped baffle arrangement with sliding seals to isolate the purging portion from the drying portion. The purge air passes through a cooler and is reintroduced to the air stream before the drying portion of the drum. Unfortunately, the drum dryer has the same problem with desiccant regeneration at light load and unloaded as the twin tower.

While several different approaches have been attempted, efficiency increases have been minimal.

SUMMARY OF THE INVENTION

In accordance with the invention, a recycled purge air dryer employs a first stage heat exchanger, allowing heated, dry purge air to be diverted to the offline tower for regeneration of the offline tower's desiccant. A novel valve configuration allows the purge dryer to achieve a zero air loss purge while maintaining a stable dew point, greatly increasing the efficiency of the air compressor.

BRIEF DESCRIPTION OF THE DRAWINGS

FIG. 3 is a table listing valve positions for FIG. 2;
FIG. 5 is a table listing transitions and valve positions for FIG. 4;
FIG. 7 is a table listing transitions and valve positions for FIG. 6;
FIG. 9 is a table listing transitions and valve positions for FIG. 8;
FIG. 11 is a table listing transitions and valve positions for FIG. 10.

DETAILED DESCRIPTION

Figure 1:
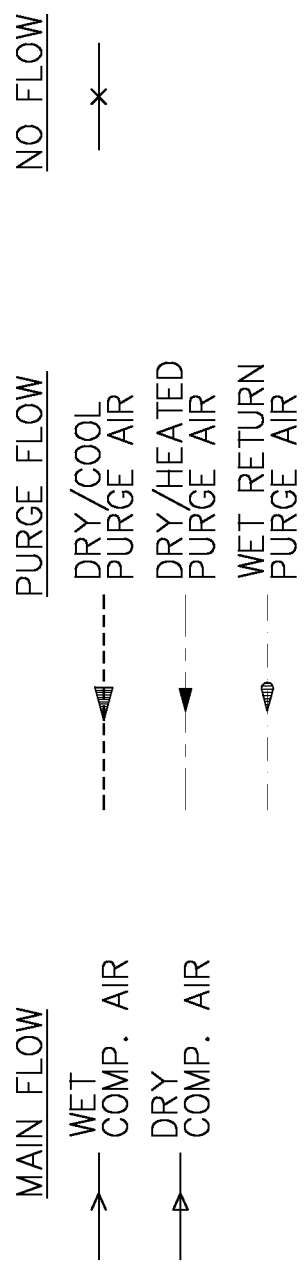
FIG. 1 is a schematic key.

A recycled purge dryer and method of use according to the present invention is illustrated in FIGS. 1-11. As will be discussed in further detail below, FIGS. 1-11 illustrate multiple flow paths, as directed through various valves, through the various components of the recycled purge dryer system 2. Looking at FIG. 1-11 it can be seen that the recycled purge dryer system 2 comprises a wet air inlet (not shown), an inlet filter 4, a loaded capacity control valve 6, a first stage compressor 8, a purge air heat exchanger 10, an intercooler 12, an intercooler separator 14, a second stage compressor 16, an aftercooler 18, an aftercooler separator 20, a pair of drying towers, 22 and 24, and a dry air outlet 26. Drying Towers 22 and 24 are filled with a desiccant (not shown). A conduit structure interconnects all aforementioned components. Ten valves are of specific interest to this disclosure, reside at varying points along the conduit structure, and can be open or closed to alter the flow of air through recycled purge dryer system 2; specifically, valves 3 (AL), 5 (AR), 7 (BL), 9 (BR), 11 (CL), 13 (CR), 15 (DL), 17 (DR), 19 (PH), and 21 (PC). The opening and closing of valves, as well as monitoring of pressure and temperature elements throughout recycled purge dryer system 2 are monitored/controlled through a control system (not shown), as is well known in the industry. It should be noted and understood that certain valves, such as switching valves 3 (AL) and 5 (AR) could be one valve with two "sides" or two separate valves depending on the flow requirement of different sized dryers.

Figure 2:
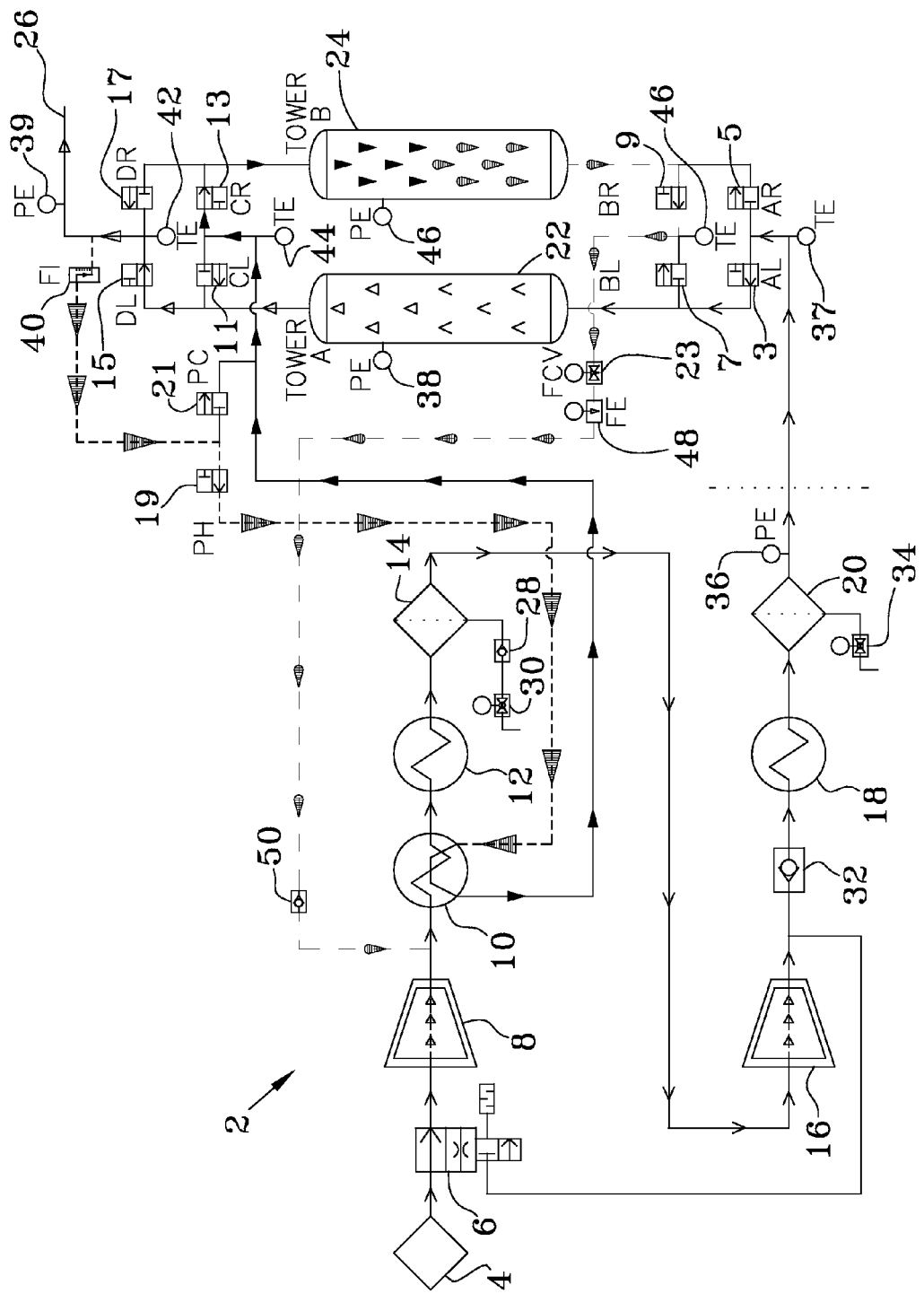
FIG. 2 is a schematic view of recycled purge air dryer of the present invention wherein Tower A is the drying tower and Tower B is being regenerated using purge air from Tower A that has been heated by the first stage heat exchanger.

Looking at FIG. 2 tower 22 (Tower A) is in drying phase, while tower 24 (Tower B) is regenerating using dry purge air heated by the purge air heat exchanger 10, accomplished by closing valves 5 (AR), 7 (BL), 11 (CL), 17 (DR) and 21 (PC), and opening valves 3 (AL), 9 (BR), 13 (CR), 15 (DL), and 19

(PH). This valve configuration allows wet inlet air to pass through inlet filter 4, capacity control valve 6 first stage compressor 8, and purge air heat exchanger 10. After the heat exchanger 10, the warm wet air travels through intercooler 12 and then intercooler separator 14 to knock out any moisture, which can be drained via first drain 28 and second drain 30. Now, the air moves to second stage compressor 16, through check valve 32, aftercooler 18, and aftercooler separator 20, where additional moisture can be drained via third drain 34. A first pressure element 36 monitors the pressure of the cooled dry air out of aftercooler separator 20, and a first temperature element 37 monitors the air stream before it moves through AL valve 3 through to tower 22 wherein the desiccant within tower 22 removes any remaining moisture. A second pressure element 38 is located on tower 22. Upon leaving tower 22 the air flows through open DL valve 15 to outlet 26. Third pressure element 39 monitors the pressure of the dry compressed air, immediately before outlet 26. After passing through DL valve 15 a small portion of the dry compressed air is drawn off for purge air (dashed line). Second temperature element 42 is located between DL valve 15 and DR valve 17. Flow indicator 40 allows for the adjustment of the amount of purge air that is drawn, typically 3-5%. The purge air then travels through open PH valve 19 to purge heat exchanger 10 where it is heated to within 10 degrees of the inlet air temperature. The purge heat exchanger 10 is placed on the first stage, because even when the dryer 2 is unloaded, first stage compressor 8 is still running and generating heat—heat that is always available for regeneration. As long as the temperature in the heat exchanger is above 200 degrees Fahrenheit, the purge air will be drying efficiently. Purge air then travels through selection CR valve 13 through tower 24, regenerating its desiccant as it travels through tower 24. A third temperature element 44 is located between CL valve 11 and CR valve 13. Fourth pressure element 46 is located on tower 24. The purge flow strips moisture from tower 24 (regenerating the desiccant) and is directed through BR valve 9 through a flow control valve 23, which is monitored by flow element 48. A fourth temperature element is located between BR valve 9 and BL valve 7. The flow control valve allows the purge air flow to be adjusted, to maintain a constant flow before passing through second check valve 50 and back to the main airflow. The mass of air entering the heat exchanger 10 is going to be a few percent higher than what is coming out of the first stage compressor because of the addition of the purge air from the outlet of the tower B 24 air. (However, this is balanced by the same percentage or mass of dried air that is diverted from the mainstream flow that exits the online tower 22 (Tower A). The first stage controls the positive displacement amount (mass) of air coming out of the back end recycled purge dryer system 2. Thus, no mass of air is lost in the entire process of regenerating the offline tower 24 (Tower B) in FIG. 2. Essentially, some of the heat generated by the first stage compressor 8, while it is running (either loaded or unloaded) is recaptured by a stream of dried, cool air drawn off of the outlet of the online drying tower, and is used as a dried, hot purge air to help regenerate the offline tower. This pressurized, heated air is then cooled in its passage across or through desiccant in the regenerating tower 24 and then reenters the main airflow at the outlet of the first stage compressor 8 as wet, cool pressurized purge air. This process is a completely closed loop within system 2. It saves the cost of using electrical heaters for regenerating the offline tower and also avoids dew point spikes—there is simply no loss in efficiency. The following steps and figures serve to illustrate the different valve manipulations necessary to complete the drying/regeneration cycle and to switch over the operation of the two towers, 22 and 24.

Figure 4:
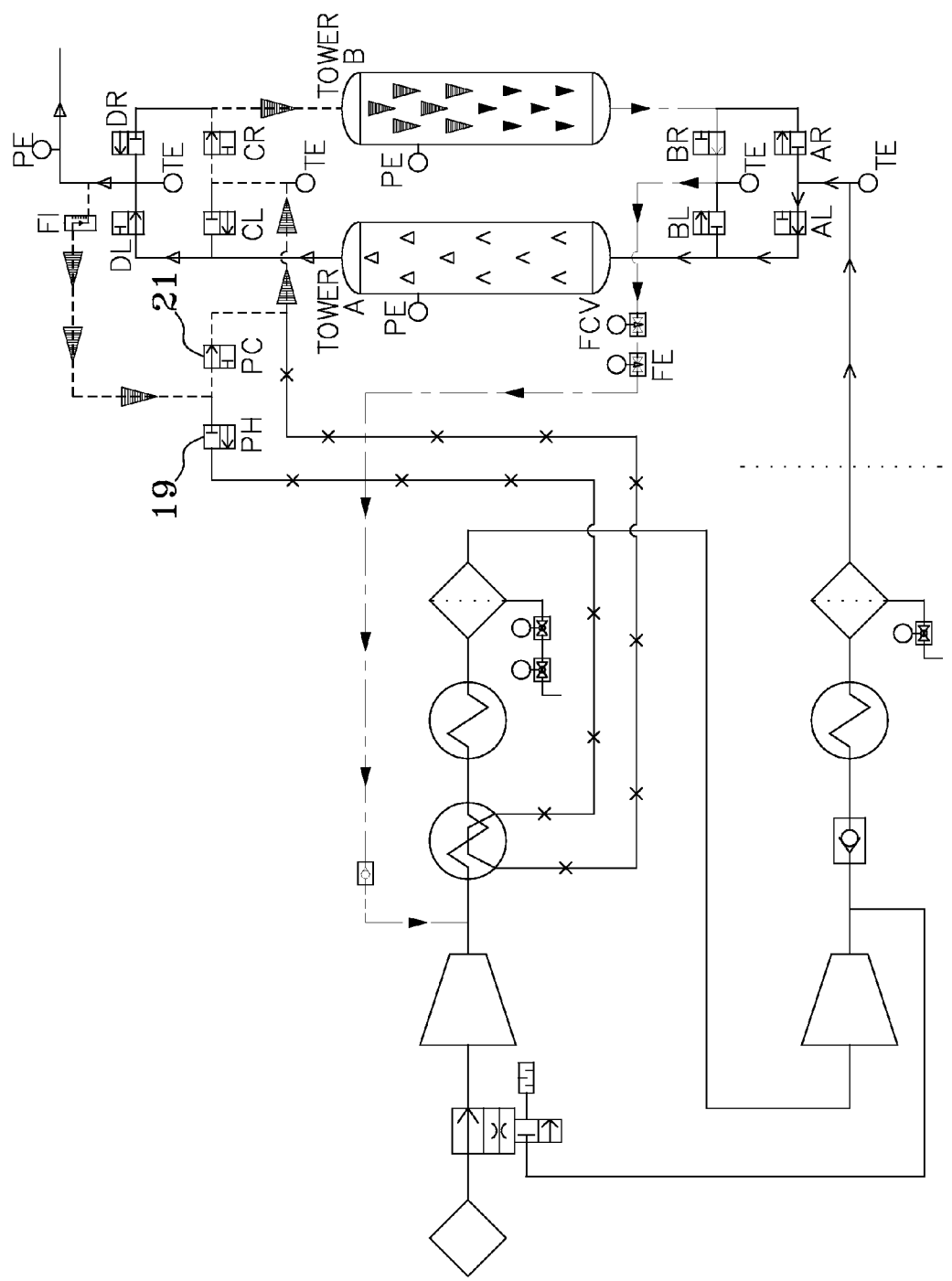
FIG. 4 is a schematic view of a recycled purge air dryer of the present invention wherein Tower A is drying and Tower B is undergoing purge cooling using dry purge air from Tower A.

Turning to FIGS. 4 & 5, it can be seen that PH valve 19 has been closed and PC valve 21 has been opened, directing cool dry purge air to open CR valve 13 to tower 24, cooling the desiccant within tower 24 in preparation for the switch over from online tower 22 to offline tower 24. First temperature element 37 is closely monitored, and as soon as the temperature at element 37 is low enough to switch to tower 24 without a dew point spike, then tower 24 will be brought up to pressure to avoid a pressure spike when tower 22 goes offline and tower 24 goes online. A pressure spike can move the desiccant, causing dusting, abrasion, and desiccant degrading, and should be avoided. Since hot desiccant will not adsorb moisture from the air stream, if the desiccant is not cooled before use, then warm wet air can pass through the dryer to the outlet still saturated with moisture. This is the cause of the downstream dew point spike. Spikes in dew point can be very serious to many processes, where moisture is considered a contaminate.

Figure 6:
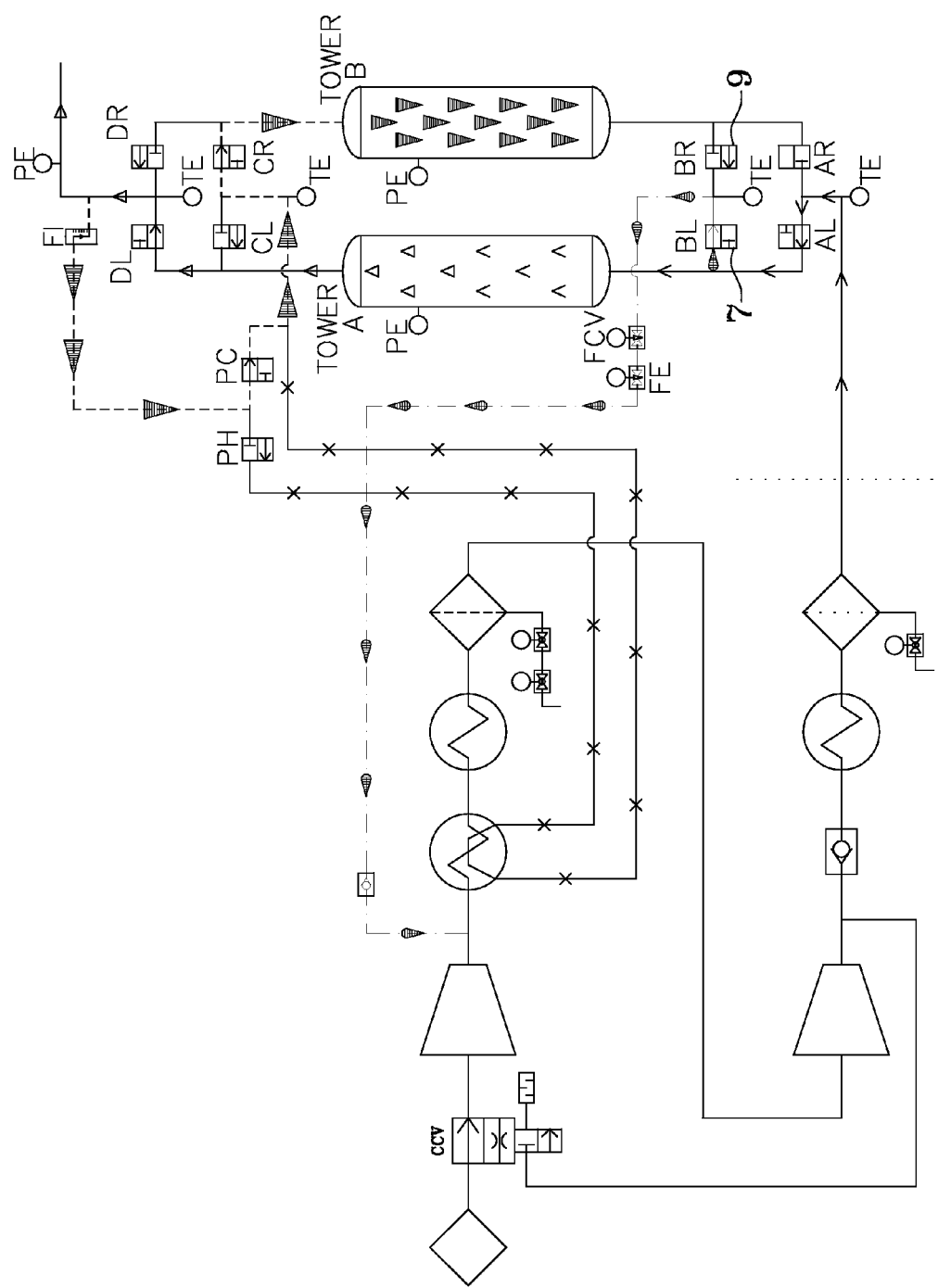
FIG. 6 is a schematic view of a recycled purge air dryer of the present invention wherein Tower A is drying, and the outlet valves of Tower B have been closed, allowing Tower B to be pressurized using dry purge air.

Looking at FIGS. 6 & 7, tower 24 is quickly brought up to air line pressure by closing BR valve 9 and opening BL valve 7, which quickly cuts off the flow of purge air out of tower 26.

Figure 8:
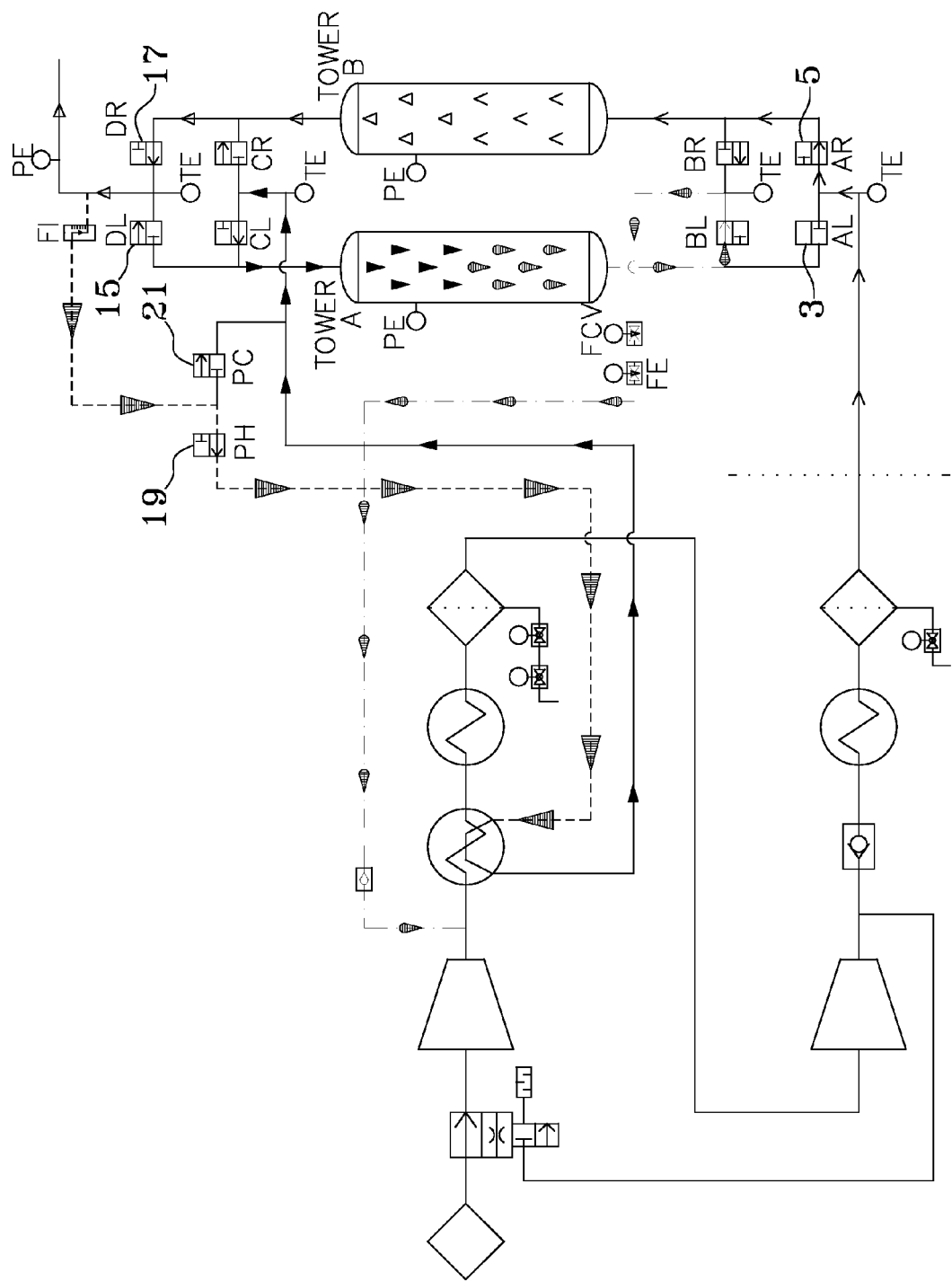
FIG. 8 is a schematic view of a recycled purge air dryer of the present invention wherein Tower A is depressurizing and Tower B is drying (online)

FIGS. 8 & 9 illustrate the switchover, tower 22 is now depressurizing and tower 24 is drying. To achieve the switch, AL valve 3 closes and AR valve opens. DL valve 15 closes and DR valve 17 opens, and PH valve 19 opens and PC valve 21 closes. Depressurizing tower 22 is not done abruptly, to avoid dusting the desiccant, and accordingly flow control valve 23 is employed.

Figure 10:
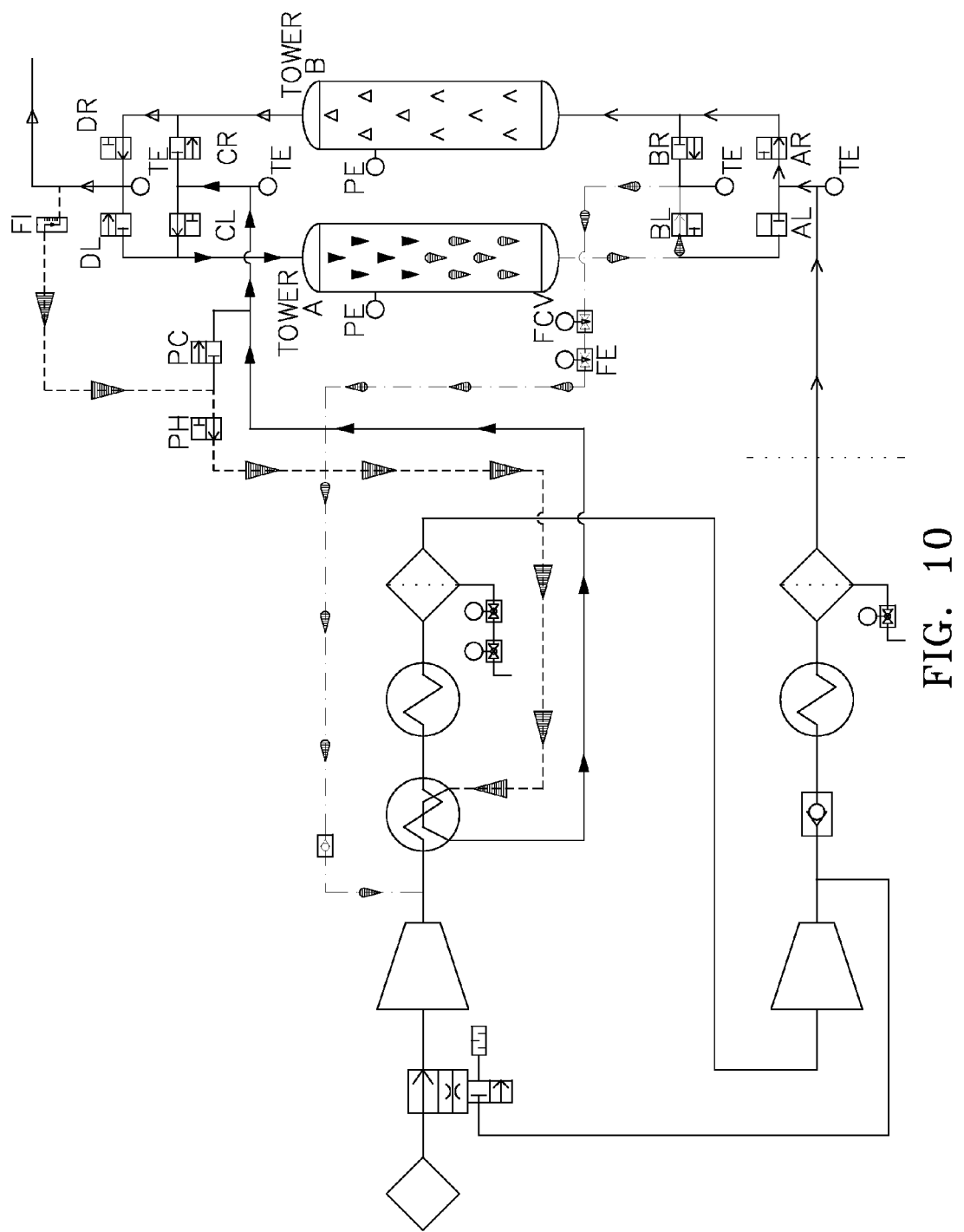
FIG. 10 is a schematic view of a recycled purge air dryer of the present invention wherein Tower A is being regenerated (offline) using dry purge air heated by the first stage heat exchanger and Tower B is drying (online). This is the same process flow as FIG. 1 but with the Towers reversed.

Finally, FIG. 10 is identical to FIG. 1 except tower 24 (Tower B) is drying and tower 22 (Tower A) is being regenerated using dry purge air. CR valve 13 closes and CL valve 11 opens to achieve this. A zero air loss purge as been achieved, while maintaining a stable dew point, greatly increasing the efficiency of the air compressor.

The forgoing description is meant to be exemplary only and should not be deemed limiting. Therefore, it is intended that this invention be limited only by the claims and the equivalents thereof.

I claim:
1. A recycled purged air dryer comprising:
an inlet filter for receiving wet inlet air;
a control valve;
a first stage compressor;
a heat exchanger connected;
an intercooler;
an intercooler separator;
a second stage compressor;
an aftercooler;
an aftercooler separator;
a first desiccant filed drying tower;
a second desiccant filed drying tower;
a conduit structure for interconnecting said inlet filter to said control valve, said control valve to said first stage compressor, said first stage compressor to said heat exchanger, said heat exchanger to said intercooler, said intercooler to said intercooler separator, said intercooler separator to said second stage compressor, said second stage compressor to said aftercooler, said aftercooler to said aftercooler separator, and said aftercooler separator to said first drying tower and said second drying tower; and
a valve configuration connected to said conduit structure for controlling airflow through said conduit structure;
wherein said valve configuration can be actuated to divert a portion of the dry compressed air exiting said first drying tower to said heat exchanger for heating and then diverted to said second drying tower as dry compressed heated air.

2. The recycled purged air dryer of claim 1 wherein said valve configuration can be actuated to divert 3-5% of the dry compressed air exiting said first drying tower to said heat exchanger for heating.

3. The recycled purged air dryer of claim 1 wherein said valve configuration connected to said conduit structure for controlling airflow through said conduit structure comprises ten valves.

\* \* \* \* \*